United States Patent [19]

Hashimoto

[11] Patent Number: 4,833,704

[45] Date of Patent: May 23, 1989

[54] AUTOMATIC TELEPHONE ANSWERING AND RECORDING DEVICE WITH AUTOMATIC TWO-WAY CONVERSATION RECORDING FUNCTION CONTROLLED BY OFF/ON HOOK DETECTOR

[75] Inventor: Kazuo Hashimoto, Tokyo, Japan

[73] Assignee: Hashimoto Corporation, Japan

[21] Appl. No.: 110,230

[22] Filed: Oct. 19, 1987

Related U.S. Application Data

[63] Continuation-in-part of Ser. No. 725,017, Apr. 18, 1985, abandoned.

[51] Int. Cl.⁴ ............................................. H04M 1/65
[52] U.S. Cl. ......................................... 379/79; 379/70; 379/85
[58] Field of Search ................. 379/70, 74, 77, 79–82, 379/85

[56] References Cited

U.S. PATENT DOCUMENTS 3,721,765  3/1973  Ho ........................................ 379/70
4,074,081  2/1978  Humm .................................. 379/82
4,720,846  1/1988  Hattori ................................ 379/79

Primary Examiner—Alan Faber
Assistant Examiner—James Tomassini
Attorney, Agent, or Firm—McGlew & Tuttle

[57] ABSTRACT

The present invention relates to an automatic telephone answering device with an automatic switching mechanism for switching between an automatic answering mode and a two-way conversation recording mode. When a telephone is put into an off-hook condition for a direct conversation with a calling party while the automatic answering mode is in a standby condition or in operation, such an off-hook condition is detected by a current detector and the conversation is recorded on a recording tape without any limitation of time. When the telephone is put into an on-hook condition during the recording of the conversation, the current detector or a voice signal detector is operated to stop the recording operation, and then the device is automatically brought into a standby condition for the next call.

10 Claims, 2 Drawing Sheets

4,833,704

AUTOMATIC TELEPHONE ANSWERING AND RECORDING DEVICE WITH AUTOMATIC TWO-WAY CONVERSATION RECORDING FUNCTION CONTROLLED BY OFF/ON HOOK DETECTOR

This is a continuaton-in-part Application based on our Parent Application No. 725,017, filed on Apr. 18, 1985 now abandoned.

BACKGROUND OF THE INVENTION

Field of the Invention

The present invention relates to a telephone answering and recording automatic switching device and more particularly a telephone answering device capable of being used in an automatic answering and recording mode and a 2-way conversations recording mode between calling and called parties.

There are many automatic answering telephone devices capable of recording 2-way conversations. When recording a conversation on the known devices, a recording pushbutton is depressed to record signals on the recording tape and to put the device in an ordinary recording mode for recording the conversation. There is a situation in which a telephone call comes in while a party being called is actually available, and after the automatic answer operation has been actuated, the person wants to pick up the telephone handset to talk to the calling party. In such a case, it would be convenient for the recording tape to keep on operating for automatically recording the conversation between the parties. It would also be convenient if, when the parties hang up after the conversation is finished, the recording operation of the tape were to stop, and the automatic answering telephone device were automatically to be brought back to a standby condition. The automatic answering telephone device would otherwise not usually be capable of handling the next call unless it were returned automatically to an automatic operation mode after the recorded message has been played back.

U.S. Pat. No. 4,074,081 issued Feb. 14, 1978, to Humm discloses a telephone answering device which operates so that when a called party lifts the handset of the telephone set, the telephone answering device is disconnected from the line. When the party hangs up the handset, the device is reconnected to the line. After reconnection of the device to the line, the manual switch of the device may be actuated so that 2-way conversation recording is enabled.

According to the Humm patent, if, during a telephone conversation, the called party realizes that the conversation should be recorded, the party must immediately turn on the 2-way conversation recording switch. Unfortunately, a portion of the conversation before the actuation of the switch would not have been recorded. Additionally, the need to actuate the switch may result in a party foregetting to turn the switch on during a conversation which should be recorded.

SUMMARY OF THE INVENTION

With the conventional demands in view, it is an object of the present invention to provide an automatic telephone answering and recording device capable of automatically switching between an automatic answering mode and a 2-way conversation recording mode, without requiring the user to do any tedious switching operation.

According to the present invention, there is provided an automatic telephone answering and recording device comprising first circuit means for detecting an interruption or an abrupt reduction of a current after an on-hook (hung-up) condition, second circuit means for detecting an off-hook condition of a telephone set, means for delivering an answering message recorded on an answering tape to the calling party, means for recording a message from the calling party on a recording tape after the answering message has been delivered, third circuit means for disabling an automatic answering mode in response to the detection by the circuit means of the off-hook condition of the telephone of the called party in order to establish a conversation between the calling and called parties while the answering tape or the recording tape is being in operation, and for recording the conversation on the recording tape, and means for automatically disabling the third circit means to stop the recording operation in response to the detection by the first or second circuit means of the on-hook condition of the telephone of the calling or called party while the conversation is being recorded, and for automatically establishing a standby condition for automatically answering a next call.

According to the present invention, the device of the invention operates in such a way that when the called parties telephone set receives a call signal from the calling parties telephone set, the automatic answering device is actuated. If the called party picks up his telephone handset (off-hooking) during the playback operation of the answering tape, the recording tape starts recording the conversation between both parties. If the automatic answering device is actuated during the recording of the voice of the calling party by the recording tape, the recording operation continues so as to record the conversation between the called party and the calling party.

When the calling party or the called party hangs up his handset (on-hooking), the recording tape stops and additionally if the off-hook state was affected (the called party picks up the handset) during the operation of the answering tape, the answering tape is indexed so as to establish a standby state so the answering tape will be in a ready state for answering the next call.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
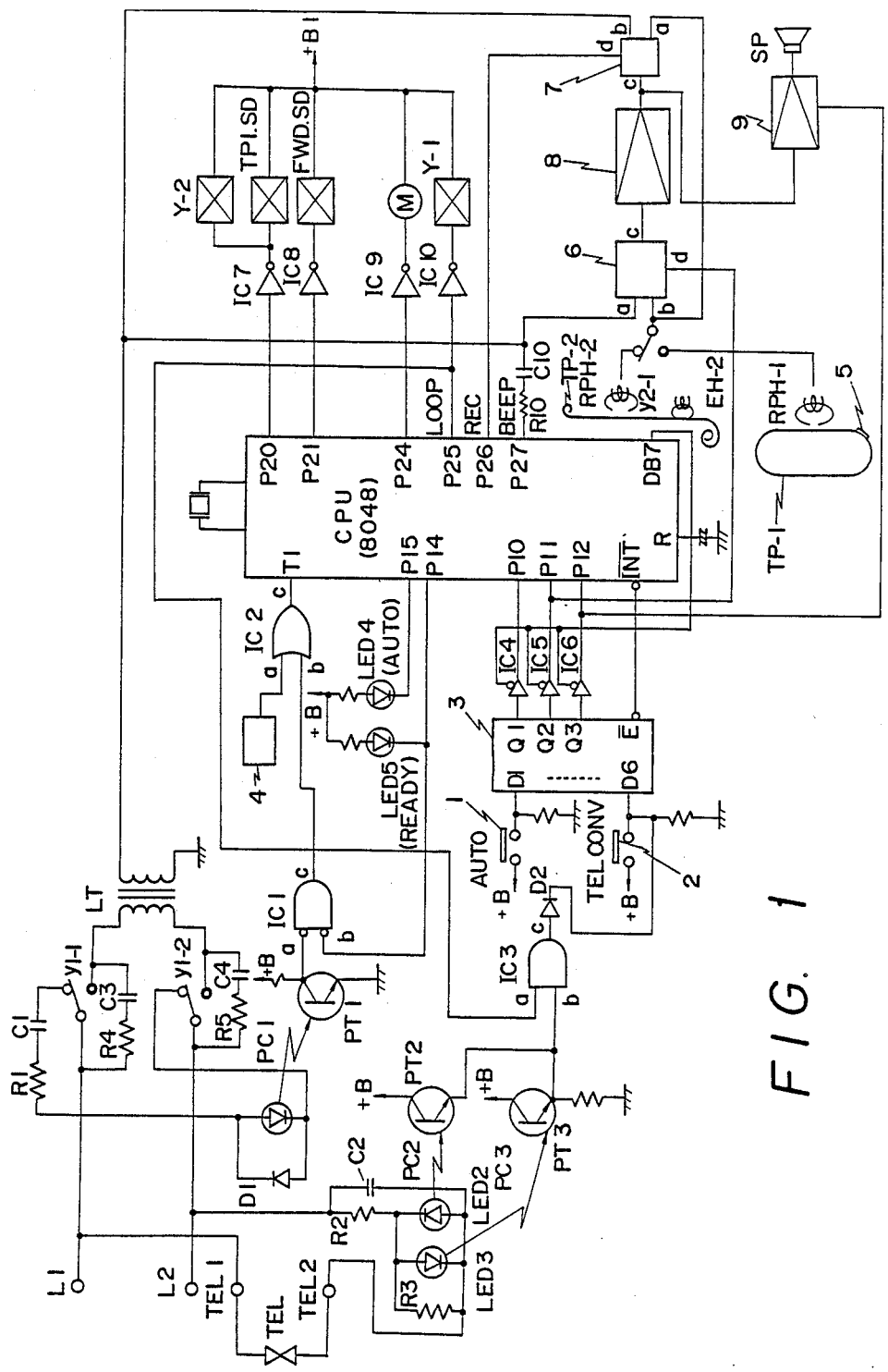
FIG. 1 is a circuit diagram of an automatic answering and recording telephone device according to the present invention.

Referring to the drawings, in particular, there is shown an automatic answering and recording device for use with telephone transmission lines and a telephone set, the telephone set having an off-hook and an on-hook state. The automatic answering and recording device is comprised of transmission lines terminals adapted for connection with the transmission lines, calling signal detection means for detecting a calling signal at the transmission lines answering tape means responsive to the signal detection means and operatively connected to the transmission lines for delivering an answering message when a calling signal is detected and for providing an automatic answering mode, recording tape means operatively connected to the transmission lines after the answering meassage has been delivered, off-hook detection means operatively connected to the telephone set, answering disabling means operatively connected to the answering tape means and responsive to the off-hook detection means for disabling the automatic answering mode, two-way recording means responsive to the off-hook detection means for establishing a two-way recording mode while the answering tape or the recording tape is in operation, on-hook detection means operatively connected to the telephone set for detecting the on-hook state of the telephone set, and two-way recording means responsive to the on-hook detection means for stopping or disabling the recording tape means and reset means operatively connected to the answering tape means and responsive to the on-hook detection means for automatically establishing a standby condition for automatically answering a next call. The device of the present invention also includes an indication means which is associated with the off-hook detection means for delivering at predetermined intervals, an indication that the two-way recording means is activated and recording a conversation between the parties. In addition, a loudspeaker device is provided which is operatively connected to the transmission lines so that a user of the device may hear the message or statement of a caller. The above-mentioned loudspeaker may be deenergized by a deenergizing means, associated with the off-hook detection means and responsive to the off-hook detection means, for deenergizing the loudspeaker when the telephone set changes from an off-state to an on-hook state.

An automatic answering and recording telephone device according to the present invention has transmission line terminals L1, L2 for connection to transmission lines, telephone terminals TEL1, TEL2 for connection to a telephone TEL, a line transformer LT, and a plurality of photocouplers PC1, PC2, PC3 each composed of a light-emitting diode and a phototransistor. The photocoupler PC1 serves to detect a calling signal, and the photocouplers PC2, PC3 are employed to detect an off-hook condition of the telephone TEL. The device also has a key 1 for setting the device into an automatic mode, and a key 2 manually operable for recording a conversation between calling and called parties on a tape TP-2. Though the device has other keys, they have no direct bearing on the present invention and are omitted from illustration. Outputs from the keys 1, 2 are converted by a decoder 3 (MC 14532 in the illustrated embodiment) into binary numbers. A starting position on an answering tape TP-1 is detected by a starting point detecting circuit 4. A conductive foil 5 is attached to the answering tape TP-1 at its starting point. Designated at 6, 7 are recording and playback switching circuits composed of analog switches or the like. In each of these circuits 6, 7, terminals a, c are connected when a "1" signal is applied to a terminal d, and terminals b, c are connected when a "1" signal is applied to the terminal d. Designated at 8, 9 are amplifiers, CPU a central processing unit such as 8048, IC1 a NAND gate, IC2 an OR gate, IC3 an AND gate, IC4 through IC6 3-state buffers, and IC7 through IC10 driver circuits. Denoted at Y-1 is a relay for a transmission line loop, Y-2 a head switching relay having contacts Y1-1, Y1-2, Y2-1, and TP1.SD and FWD.SD solenoids. When solenoids TP1.SD and FWD.SD are energized while a motor M is energized, the answering tape TP-1 is fed along. When the solenoid FWD.SD is energized while the motor M is energized, the recording tape TP-2 is fed along in a normal direction. In the illustrated embodiment, an endless tape is employed as the tape TP-1 for illustrative purpose, but other media may be used providing they have an indexing means. An indexing means being a device for positioning the answer tape, TP-1 so that the tape is positioned at the beginning of the outgoing message.

The operation will be described in a condition in which the device is placed in a standby mode by depressing the key 1 (AUTO) and there is an incoming call. When the key 1 (AUTO) is depressed, an output Q1 of the decoder 3 becomes "1", and an interrupt signal is simultaneously applied from a terminal E to the CPU. The CPU is controlled by a program to enter an output of the decoder 3 through the 3-state buffers IC4–IC6 and input ports P10–P12 into an accumulator in the CPU. Thereafter, the CPU is controlled by the program to set the output of an output port P15 to "0" for energizing a light-emitting diode LED 4 (AUTO). After thus confirming and indicating that the device has been set to the AUTO position, output ports P20, P21, P24 are set to "1" to energize the solenoids TP1.SD and FWD.SD and the motor M to feed the answering tape TP-1 indexing so as to position the answering tape TP-1 at the beginning of the outgoing message. When the answering tape TP-1 makes one revolution and reaches a starting point, the conductive foil 5 is detected through the starting point detector circuit 4, terminals a, b of the OR gate IC2, and a terminal T1 of the CPU by a program for testing T1, and then the indexing of the answering tape TP-1 is finished by the program. The CPU is further controlled by the program to set an output port P14 to "0" to energize a light-emitting diode LED 5 (READY), thus indicating that the device is fully in a standby condition.

When a calling signal arrices at the terminals L1, L2, it is detected through the photocoupler PC1, the NAND gate IC1, the OR gate IC2, and the terminal T1 of the CPU. The output ports P20, P21, P24, P25 are set to "1". The answering tape TP-1 is then fed along and the relay Y-1 is energized to connect the transmission lines to a loop through the contacts Y1-1, Y1-2, or the contacts Y1-1 and Y1-2 are switched to the lower side in FIG. 1 by the operation of the transmission Y loop relay Y-1. The relay Y-2 is also turned on to connect a recording and playback head RPH-1 through the contact Y2-1. The reproduced answering message is delivered through terminals b, c of the recording and playback switching circuit 6, the amplifier 8, and terminals c, b of the recording and playback switching circuit 7, and thence through the line transformer LT into the transmission lines. After one revolution of the answering tape TP-1, it is stopped and a beep tone generated by the program is issued through an output port P27, and simultaneously the output port P21 is set to "1" to energize the solenoids FWD.SD for thereby feeding the recording tape TP-2 in the normal direction. At the same time, the output ports P26, P11 are set to "1" to switch the recording and playback switching circuits 6, 7 to a recording mode (in which the terminals a, c are connected). The message of the calling party is now delivered through the line transformer LT, the terminals a, c of the recording and playback switching circuit 6, the amplifier 8, the terminals c, a of the recording and playback switching circuit 7, and the break contact Y2-1 to a recording and playback head RPH-2. From here the meassage is recorded on the recording tape TP-2. This recording mode is finished upon elapse of a time determined by the program or finished by a VOX circuit (not shown), and then the device returns to the standby condition. During the recording mode, the output port P12 can be set to "0" to energize the power amplifier 9 to allow the calling party's message to be monitored through a loudspeaker SP. This feature may be performed by using standard equipment. For example, model "LA 4160", which is one of the amplifying IC's manufactured by Sanyo Electric, Ltd., operates in such a manner that even if its feedback terminal, the number 3 pin is changed to "1", the power amplifier is kept cut-off and inoperative, and as the aforementioned terminal is set to "0", an operative state results. It should be understood that the setting of P12 to "0" takes place when the telephone set receives a call signal in its standby state. In its standby state, the automatic answering telephone device operates, the answering tape TP-1 operates and then the recording tape TP-2 operates to effect a recording mode. The setting of P12 to "0" is accomplished by the program of the CPU. As the person of ordinary skill in the electric computer field will appreciate, the setting of all ports to "1" (with the inclusion of P12) is accomplished by the CPU program.

The CPU program includes an interrupt operation which takes place when the handset is removed or picked up (off-hook) during the operation of the automatic answering telephone device or during the operation of the telephone answering device after a standby state. Accordingly, after the handset has been brought into an off-hook state, the called party may hear voices of the calling party through the handset and it will not be necessary to keep the loudspeaker on. Accordingly, in the description which follows turning the loudspeaker off is described by setting the port P12 to "1".

Figure 2:
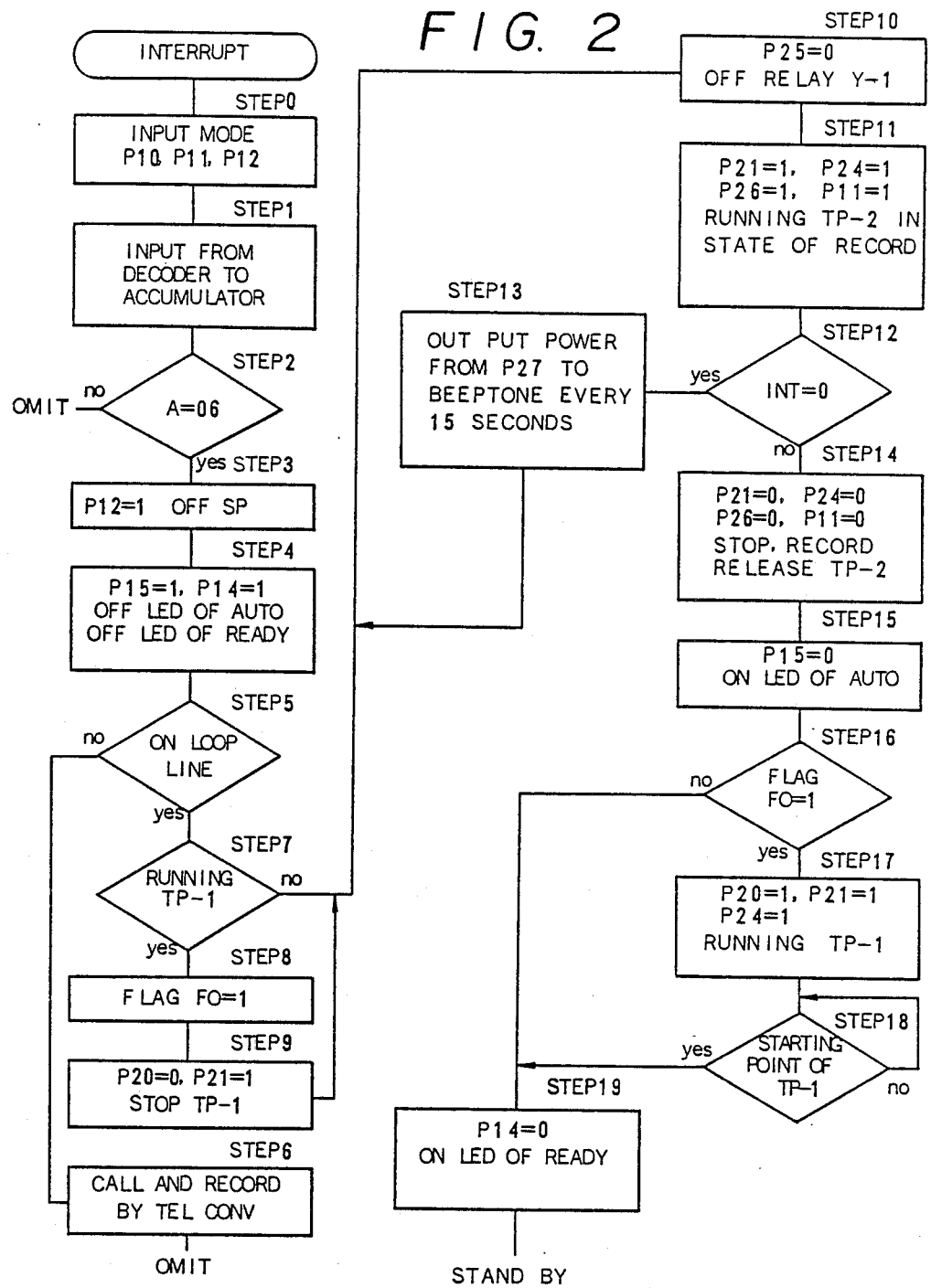
FIG. 2 is a flowchart of an interrupt operation of a programmed CPU in the circuit shown in FIG. 1.

The interrupt operation of the device will be described with reference to the flowchart of FIG. 2 with respect to a mode in which the handset is removed from its switch, or the telephone TEL is in an off-hook condition while the device is in the foregoing operation, or the transmission lines during a condition in which the relay contacts Y1-1 and Y1-2 are switched to the lower side shown in FIG. 1 by the operation of the transmission line loop relay Y-1. There are two off-hook timings, one during the playback of the answering tape TP-1 and one during the recording on the recording tape TP-2.

When the handset is removed from its switch while either the answering tape TP-1 or the recording tape TP-2 is being fed along, a loop circuit is formed. This loop circuit is comprised of the telephone TEL, the light-emitting diode LED2 or LED3 dependent on the polarity of the transmission lines, and a resistor R2, parallel to the loop circuit, including the primary winding of the line transformer LT. As a result of the formation of this loop circuit, the light-emitting diode LED2 or LED3 is energized. The phototransistor PT2 or PT3 is then energized to change the terminal b of the AND gate IC3 from "0" to "1". Since the terminal a of the AND gate IC3 has already been at "1" caused by the output port P25, as described above, a signal "1" is applied from the terminal c of the AND gate IC3 through a diode D2 to a terminal D6 of the decoder 3 for thereby setting the terminal E to "0". An interrupt signal is applied through an interrupt terminal INT to the CPU, whereupon the program goes to a step 0 in FIG. 2. In the step 0, the ports P10, P11 and P12 are switched to an input mode. Then, one terminal DB7 of a data bus is temporarily changed from "1" to "0" in a step 1 to energize the 3-state buffers IC4–IC6 for entering the outputs Q0–Q2, via the ports P10–P12, into an accumulator A in the CPU. A step 2 checks whether the outputs from the decoder 3 result from an input terminal D6 thereof (output code 06, that is, Q0=0, Q1=1, Q2=1). If the code is "06", then the program goes to a step 3 in which the output port P12 is set to "1" to deenergize the amplifier 9 for inactivating the loudspeaker SP. In a step 4, the output ports P15, P14 are set to "1" to deenergize the light-emitting diodes LED 4 (AUTO), LED5 (READY) having an operation mode different from that for conversation recording. Then, a step 5 checks whether the transmission lines are in a condition in which the relay contacts Y1-1 and Y1-2 are switched to the lower side in FIG. 1 by the operation of the transmission line loop relay Y-1. This checking test is performed in such a manner that when the loop relay Y-1 is turned on by setting the output port P25 to "1", a flag (for example, 8048 contains a flag F1) is set by the program and whether or not the flag is actually set is judged by the program. During the closed state of the transmission lines, contained by the present device as described above, the output port P25 is kept at "1" and the relay Y-1 is held on. However, the CPU used in the present device has no test command to check whether the aforementioned output pot P25 is "1" or "0". For this reason, at the time of setting the output port P25 to "1", the aforementioned flag F1 is set to "1" to perform indirect testing as to whether the output port P25 is "1", i.e., the transmission lines are in the closed state (in a loop). If the transmission lines are not in a loop, or if there is an incoming call during another operation mode and the conversation beteen the parties is to be recorded, then the program enters this routine by manually turning on the key 2 (TEL CONV). If the transmission lines are in the loop, the program goes to a step 7 which ascertains whether the off-hook is effected while the answering tape TP1 is being fed. If the user removes the handset while the answering tape TP-1 is being fed, the tape TP-1 is required to be indexed.

That is, in order to effect the indexing operation the answering tape TP-1 is fed. As the conductive foil 5 attached to the starting point is detected by the program via the starting point detecting circuit 4, the output port P24 is changed to "0" to turn off the motor M and thereby stop the answering tape TP-1. In this case, a flage F0, for example, is set to "1" in a step 8, and the output ports P20, P21 are set to "0" in step 9 to stop the answering tape TP-1, followed by the program going to a step 10. If the handset is removed, not during the running of the answering tape TP-1 but during the running of the recording tape TP-2, then the program skips the steps 8, 9 and goes directly to the step 10 as will be described later. The indexing of tape TP-1 is then performed in steps 17 and 18. When the recording operation begins, the answering tape TP-1 stops. However, the indexing is effected after the termination of conversation and prior to the telephone set returning to its standby state as is described below. In the step 10, the output port P25 is set to "0" to turn off the loop relay Y-1 for the reason that if the line transformer LT were directly connected to the loop while the conversation is being recorded, the voice level would be attenuated to a level lower than a prescribed value. In a step 11, the output ports P21, P24 are set to "1" to energize the solenoid FWD.SD and the motor M for feeding the recording tape TP-2 in the normal direction, and the output ports P26, P11 are set to "1" to switch the recording and playback circuits 6, 7 to the recording mode, as described above. A step 12 determines whether the interrupt terminal INT of the CPU is at "0" or not, thereby ascertaining if the telephone TEL is in the off-hook condition or not. Since the voice signal from the calling party flows through a path composed of the line L1, a resistor R4, a capacitor C3, the primary winding of the line transformer LT, a capacitor C4, a resistor R5, and the line L2, a signal is induced across a secondary winding of the line transformer LT and recoded on the recording tape TP-2 in the manner described above. The voice signal from the called party is passed through a capacitor C2 and the same path as referred to above before being recorded on the recording tape TP-2. During the recording, a beep tone is generated from the output port P27 every 15 seconds under the control of the program in a step 13, and is sent through the line transformer LT to the calling party. Then, when the handset is placed on its switch or in an on-hook condition after the conversation is over, the light-emitting diode LED2 or LED3 which has been energized is deenergized. In some countries the current in the transmission lines is reduced when the calling party's telephone is in the on-hook condition even if the called party's telephone in the off-hook condition. This results in the light-emitting diode LED2 or LED3 being deenergized. Since the output of the phototransistor PT2 or PT3 goes back to "0", the interrupt terminal INT of the CPU returns to "1" through IC3 and the decoder 3. The program then goes to a step 14. In the step 14, the output ports P21, P24, P26, P11 are reset to "0" to stop the recording tape TP-2 and release the recording mode. In a step 15, the output port P15 is set to "0" to energize the light-emitting diode LED4 (AUTO). A step 16 checks the flag F0. If the handset is removed from its switch while the answering tape TP-1 is being fed along, the answering tape TP-1 is indexed in steps 17, 18, and the LEDs (READY) is energized in a step 19 to restore the device to the complete standby condition. If no indexing of the answering tape is required, then the program goes from the step 16 directly to a step 19, skipping the steps 17, 18, thus bringing the device in the complete standby condition.

In the conventional automatic answering device, a certain operation needs to be done by the user, if a conversation is to be recorded between the parties, when picking up the handset after the automatic answering device has operated to answer a telephone call. When either party hangs up after the conversation has ended, the tape will not be stopped automatically. If the tape is manually stopped, the device will not be automatically brought back to the standby condition for automatically answering a next call. With the present invention, however, the above problems have been solved by automatically effecting switching between the automatic answering function which is conventionally available and the recording mode in which the conversation between the parties is recorded. Therefore, the present invention is highly advantageous in practical use.

Although a certain preferred embodiment has been shown and described, it should be understood that many changes and modifications may be made therein without departing from the scope of the appended claims.

What is claimed is:

1. An automatic telephone answering and recording device associated with a telephone set comprising:
   (a) first circuit means for detecting one of an interruption or an abrupt reduction of a current after an on-hook condition for the set;
   (b) second circuit means for detecting an off-hook condition of the telephone set;
   (c) means for delivering an answering message recorded on an answering tape to the calling party;
   (d) means for recording a message from the calling party on a recording tape after the answering message has been delivered;
   (e) third circuit means for disabling an automatic answering mode in response to the detection by said second circuit means of the off-hook condition of the telephone set to establish a 2-way recording mode while said answering tape of said recording tape is still in operation;
   (f) means for automatically disabling said third circuit means to stop the recording operation in response to the detection by said first circuit means of the on-hook condition while the conversation is being recorded, and for automatically establishing a standby condition for automatically answering a next call; and,
   (g) means for indexing said answering tape means when said off-hook state is effected during the operation of said answering tape means.

2. An automatic telephone answering and recording device according to claim 1, wherein said second circuit means delivers, at intervals of a selected number of seconds, a signal indicative of recording of the conversation between the parties on the recording tape to the calling party.

3. An automatic telephone answering and recording device according to claim 1, wherein said second circuit means automatically deenergizes a loudspeaker device associated with the automatic answering mode when the telephone of the calling party is in the off-hook condition.

4. An automatic answering and recording device for use with telephone transmission lines and the telephone set, having an off-hook and an on-hook state, comprising:
   (a) transmission line terminals, adapted for connection with the transmission lines;
   (b) calling signal detection means for detecting a calling signal at the transmission lines;
   (c) answering tape means, responsive to said signal detection means and operatively connected to the transmission lines for delivering an answering message when a calling signal is detected and for providing an automatic answering mode;
   (d) recording tape means operatively connected to said transmission lines after the answering message has been delivered;
   (e) off-hook detection means, operatively connected to the telephone set, for detecting the off-hook state of the telephone set;

(f) automatic answering disabling means, operatively connected to said answering tape means and responsive to said off-hook detection means for disabling the automatic answering mode; and, (g) two-way recording means, responsive to said off-hook detection means for automatically establishing a two-way recording mode while the answering tape or the recording tape is in operation.

5. An automatic answering and recording device, according to claim 4, further comprises:

(a) on-hook detection means operatively connected to then telephone set, for detecting the on-hook state of the telephone set;

(b) two-way recording disabling means, operatively connected to said two-way recording means and responsive to said on-hook detection means for disabling said two-way recording tape means; and (c) reset means, operatively connected to said answering tape means and responsiveto said on-hook detection means, for automatically establishing a standby condition for automatically answering a next call.

6. An automatic answering and recording device according to claim 5 wherein: said on-hook detection means senses both an interruption of current and a reduction of current as the telephone set is placed in an on-hook state.

7. An automatic answering and recording device according to claim 4 further comprising: indication means, associated with said off-hook detection means, for delivering at predetermined intervals an indication that said two-way recording means is activated and recording a conversation between the parties.

8. An automatic answering and recording device according to claim 4, further comprising:

(a) a loudspeaker device operatively connected to said transmission lines; and (b) loudspeaker means deenergizing means associated with said off-hook detection means and responsive to said off-hook detection means, for deenergizing said loudspeaker when the telephone set is in the off-hook state.

9. An automatic answering and recording device for use with telephone transmission lines and a telephone set, having an off-hook and an on-hook state, comprising:

(a) transmission line terminals adapted for connection with the transmission lines;

(b) calling signal detection means for detecting a calling signal at the transmission line;

(c) answering tape means responsive to said signal detection means and operatively connected to the transmission lines, for delivering an answering message when a calling signal is detected and for providing an automatic answering mode;

(d) recording tape means operatively connected to said transmission lines after the answering message has been delivered;

(e) off-hook detection means, operatively connected to the telephone set, for detecting the off-hook state of the telephone set;

(f) two-way recording means operatively connected to the transmission lines, the telephone set and the recording tape means for automatically establishing a two-way recording mode in response to said off-hook detection means when the answering tape or the recording tape is in operation;

(g) on-hook detection means, operatively connected to the telephone set, for detecting the on-hook state of the telephone set;

(h) two-way recording disabling means operatively connected to said two-way recording means and responsive to said on-hook detection means for stopping said recording tape means;

(i) reset means, operativelyconnected to said answering tape means, and responsive to said on-hook detection means, for automatically establishing a standby condition for automatically answering a next call; and, (j) automatic answering disabling means, operatively connected to said answering tape means and responsive to said off-hook detection means for disabling the automatic answering mode.

10. A method of answering a telephone for use with transmission lines, a telephone set having an on-hook state and an off-hook state, the telephone set operably connected to the transmission lines, transmission line terminals operatively connected to the transmission lines, a calling signal detector, an answering tape for delivery of an answering message, recording tape for recording from the transmission lines and the telephone set, off-hook detector, on-hook detector, the method comprising the steps of:

(a) detecting a calling signal at the transmission line terminal;

(b) connecting, operatively, the answering tape to the transmission line terminal;

(c) recording, on the recording tape, signals from the transmission line terminals;

(d) detecting when the telephone set is in an off-hook state;

(e) detecting when the telephone set is in an on-hook state;

(f) disabling the answering tape when the telephone set changes from an on-hook to an off-hook state;

(g) recording from the transmission lines and the telephone set to achieve two-way recording on the recording tape when the telephone changes from an on-hook state to an off-hook state;

(h) disabling the two-way recording when the telephone set changes from an off-hook state to an on-hook state;

(i) resetting the answering tape when the telephone set changes from an off-hook state to an on-hook state to establish a standby condition for automatically answering a next call; and, (j) indexing said answering tape when said off-hook state is effected during the operation of the answering tape.

* * * * *